United States Patent
Hosseini et al.

(10) Patent No.: US 12,282,174 B2
(45) Date of Patent: Apr. 22, 2025

(54) CONVERTING MULTIPLE LIGHT SIGNALS INTO AND OUT OF A SINGLE WAVELENGTH WITH MULTIPLE POLARIZATIONS TO INCREASE OPTICAL BANDWIDTH

(71) Applicant: Intel Corporation, Santa Clara, CA (US)

(72) Inventors: Kaveh Hosseini, San Jose, CA (US); Conor O'Keeffe, Cork (IE); Brandon C. Marin, Gilbert, AZ (US); Hiroki Tanaka, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 896 days.

(21) Appl. No.: 17/131,714

(22) Filed: Dec. 22, 2020

(65) Prior Publication Data
US 2022/0197044 A1    Jun. 23, 2022

(51) Int. Cl.
| G02B 27/28 | (2006.01) |
| F21V 8/00 | (2006.01) |
| G02B 6/10 | (2006.01) |
| G02B 6/27 | (2006.01) |

(52) U.S. Cl.
CPC ......... *G02B 27/283* (2013.01); *G02B 6/0005* (2013.01); *G02B 6/105* (2013.01); *G02B 6/2766* (2013.01); *G02B 27/286* (2013.01)

(58) Field of Classification Search
CPC .... G02B 27/283; G02B 6/0005; G02B 6/105; G02B 6/2766; G02B 27/286
USPC .......................................................... 353/20
See application file for complete search history.

(56) References Cited

U.S. PATENT DOCUMENTS

2004/0150876 A1 *  8/2004  Dagenais ........... H04B 10/2914
                                                              359/344
2021/0103199 A1 *  4/2021  Wu ....................... G02F 1/2955

FOREIGN PATENT DOCUMENTS

WO    WO 2012/087590       6/2012
WO    WO-2012087590 A1 *  6/2012 ....... B29D 11/00644

OTHER PUBLICATIONS

Search Report from European Patent Application No. 21195492.0, mailed Feb. 28, 2022, 12 pgs.
Kikuchi Kiyofumi et al: 1-13 "Silicon-photonics-based coherent optical subassembly (COSA) for ultra-compact coherent transceiver", 2017 IEEE Compound Semiconductor Integrated Circuit Symposium (CSICS), IEEE, Oct. 22, 2017 (Oct. 22, 2017), pp. 1-3, XP033280658, DOI: 10.1109/CSICS.2017.8240426 [retrieved on Dec. 26, 2017].

(Continued)

*Primary Examiner* — Jerry L Brooks
(74) *Attorney, Agent, or Firm* — Schwabe, Williamson & Wyatt P.c.

(57) ABSTRACT

Embodiments described herein may be related to apparatuses, processes, and techniques related to a dual polarization chiplet that may be used by an optical receiver to split multi-polarized light traveling on a single fiber and carrying two or more light signals into two or more fibers each carrying the particular light signal. The dual polarization chiplet may also be used by an optical transmitter to combine multiple light signals to be transmitted onto a single fiber, where each of the multiple light signals are represented by a different polarization of a wavelength on the single fiber. Other embodiments may be described and/or claimed.

19 Claims, 10 Drawing Sheets

Mach Zehnder Modulator for Dual Polarization

Mach Zehnder Modulator for Multi Polarization (56) References Cited

OTHER PUBLICATIONS

Bernabé S et al: "Silicon photonics for 1-13 Technical Fields terabit/s communication in data centers Searched (IPC) and exascale computers", G02B Solid State Electronics, Elsevier Science HO4B Publishers, Barking, GB, vol. 179, Nov. 23, 2020 (Nov. 23, 2020), XP086553005, ISSN: 0038-1101, DOI: 10.1016/J.SSE.2020. 107928 [retrieved on Nov. 23, 2020].
Yin Jieming et al: "Modular Routing 1-13 Design for Chiplet-Based Systems", 2018 ACM/IEEE 45th Annual International Symposium on Computer Architecture (ISCA), IEEE, Jun. 1, 2018 (Jun. 1, 2018), pp. 726-738, XP033375532, DOI: 10.1109/ISCA.2018 .00066 [retrieved on Jul. 19, 2018].
Office Action from European Patent Application No. 21195492.0, mailed Feb. 24, 2025, 12 pgs.

\* cited by examiner

CONVERTING MULTIPLE LIGHT SIGNALS INTO AND OUT OF A SINGLE WAVELENGTH WITH MULTIPLE POLARIZATIONS TO INCREASE OPTICAL BANDWIDTH

GOVERNMENT LICENSE RIGHTS

This invention was made with Government support under Agreement No. HR0011-19-3-0003, awarded by DARPA. The Government has certain rights in the invention.

FIELD

Embodiments of the present disclosure generally relate to the field of photonics packaging, and in particular to optical interconnects.

BACKGROUND

Continued growth in virtual machines and cloud computing will continue to increase bandwidth demand for optical receivers and transmitters.

DETAILED DESCRIPTION

Embodiments described herein may be directed to apparatuses, processes, devices, and/or techniques relating to reducing the number of optical fibers to be coupled with an optical receiver, optical transmitter, or optical transceiver. Embodiments may be directed to an optical circuit, chip, or chiplet, which may be referred to as a dual polarization chiplet, that may be used to increase bandwidth or reduce fiber counts into and/or out of photonic devices, such as multichip packages. In embodiments, a dual polarization chiplet, or its equivalent function, may be used by an optical receiver to split multi-polarized light traveling on a single fiber and carrying two or more light signals, into two or more fibers each carrying one of the particular light signals. In embodiments, the dual polarization chiplet may be used by an optical transmitter to combine multiple light signals to be transmitted onto a single fiber, where each of the multiple light signals are represented by a different polarization of a wavelength of light on the fiber.

Thus, using embodiments described herein, the number of fibers to be physically coupled with an optical receiver, optical transmitter, or optical transceiver, may be reduced by half. As an example, if a configuration of a multichip package (MCP) with five optical tiles in the MCP delivers an aggregated bandwidth of 1 terabits per second (Tbps), then the addition of the dual polarization chiplet would increase the bandwidth to 2 Tbps. Alternatively, if the bandwidth is kept the same, the dual polarization chiplet would reduce the number of fibers coupled with the MCP by half. This would significantly reduce hardware complexity.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an ASIC, an electronic circuit, a processor (shared, dedicated, or group) and/or memory (shared, dedicated, or group) that execute one or more software or firmware programs, a combinational logic circuit, and/or other suitable components that provide the described functionality.

Various Figures herein may depict one or more layers of one or more package assemblies. The layers depicted herein are depicted as examples of relative positions of the layers of the different package assemblies. The layers are depicted for the purposes of explanation, and are not drawn to scale. Therefore, comparative sizes of layers should not be assumed from the Figures, and sizes, thicknesses, or dimensions may be assumed for some embodiments only where specifically indicated or discussed.

Figure 1:
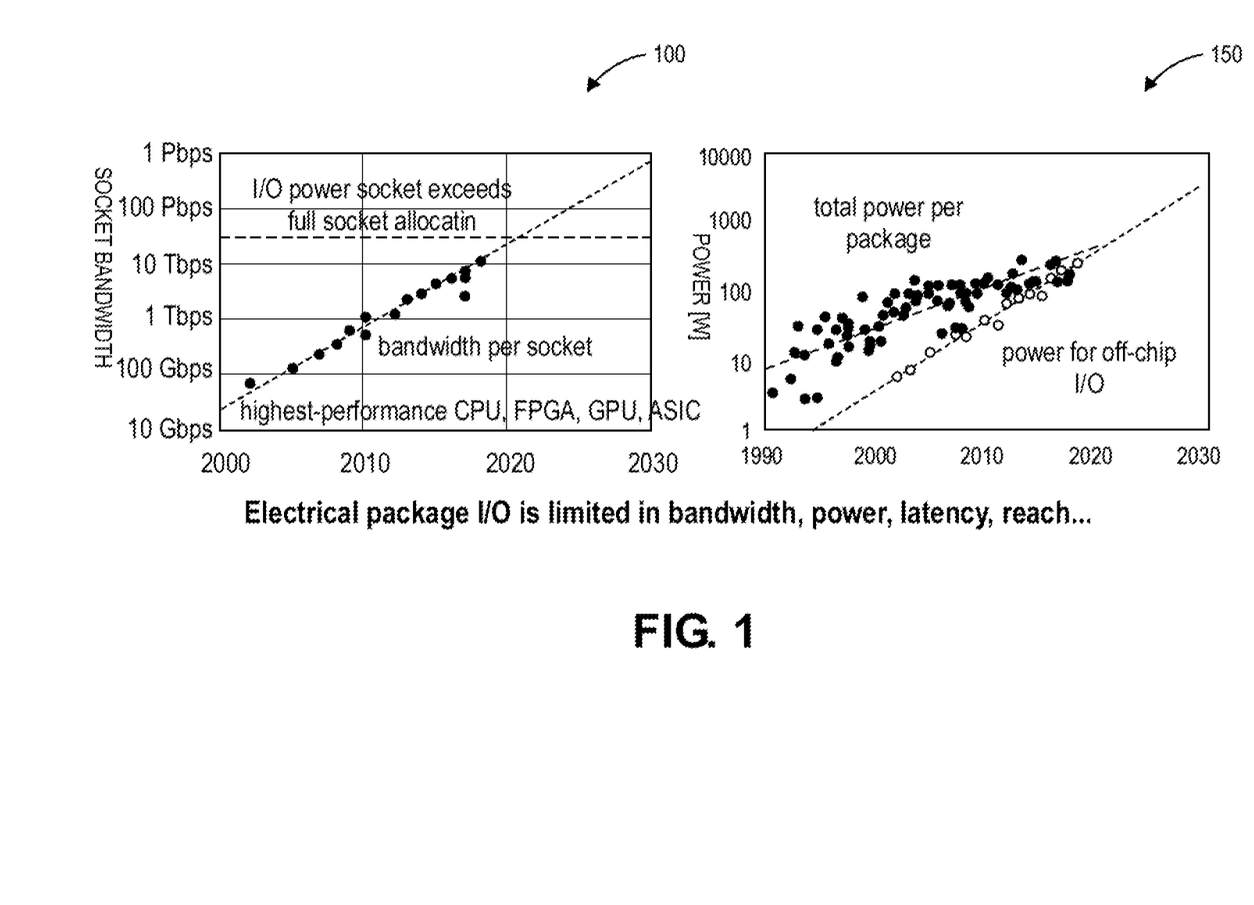
FIG. 1 illustrates example graphs of electrical socket bandwidth limitations and input/output (I/O) power consumption.

FIG. 1 illustrates example graphs of electrical socket bandwidth limitations and input/output (I/O) power consumption. Graph 100 and graph 150 show that package I/O is becoming more limited in bandwidth, power, latency, and reach. These graphs were published by DARPA, Proposer Day Slides, Nov. 1, 2018, by Gordon Keeler.

With legacy implementations, for electrical, photonic, and electro-optical packages, off-package I/O bandwidth has been steadily doubling every two years, with legacy packaging and I/O technologies having to scale to meet this bandwidth demand. As a result, package pin counts and I/O data rates have continued to increase. However, electrical I/O reach, the length of an electrical printed circuit board (PCB) trace or cable, continues to reduce at an increased rate. Additionally, I/O energy efficiency has dramatically slowed, which has resulted in a quickly approaching I/O power wall, a point at which the I/O power reaches the total power per package, for high performance packages.

Graph 100 shows an example graph of socket bandwidth compared to projected yearly performance of high performance CPUs, field programmable gate arrays (FPGA), graphics processing units (GPU), and application-specific integrated circuits (ASIC). At the current growth rate, the bandwidth per socket will soon reach the point where I/O power will exceed full socket allocation.

Graph 150 shows an example graph of power compared to the projected yearly performance of high performance processors as described above. As shown, the total power per package will soon intersect the power required for off chip I/O.

Figure 2A:
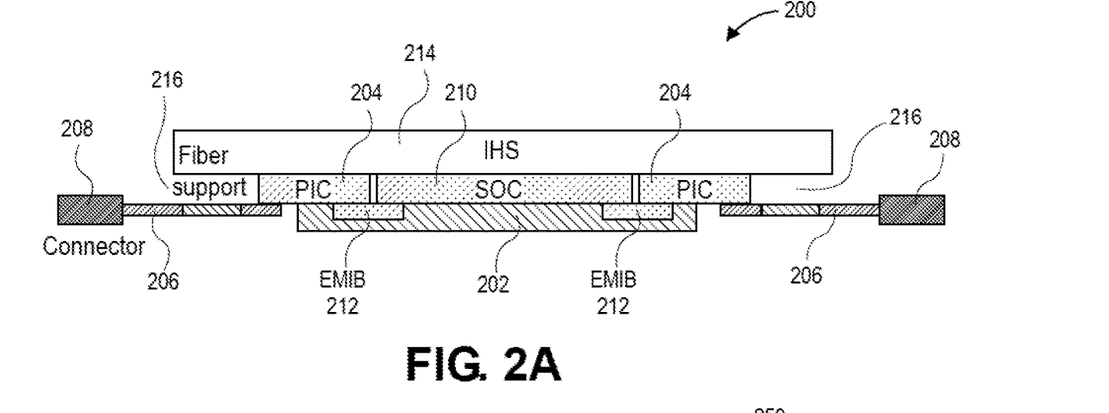
FIG. 2A-2B are diagrams of packages that include legacy photonics transmission.

FIG. 2A-2B are diagrams of packages that include legacy photonics transmission. In FIG. 2A, package 200 is a side view diagram of a legacy photonics package. The package 200 includes a substrate 202 that includes photonic integrated circuits (PIC) 204 that are optically coupled with optical paths 206 to a fiber connector 208. In legacy implementations, optical fibers (not shown) are connected to the fiber connector 208. In legacy implementations, light signals traveling on the optical fiber are on a single or multiple wavelength(s), and have just one polarization type, for example transverse electric (TE) or transverse magnetic (TM). The PICs, which may be also referred to as silicon photonics integrated circuits (ICs), may include optical receivers, optical transmitters, or optical transceivers, each optically coupled with a single or an array of optical fibers.

In legacy implementations, the PICs 204 may be electrically coupled with a system-on-chip (SOC) 210 using an embedded multi-die interconnect bridge (EMIB) 212. The EMIB 212 may be coupled with and/or recessed into the substrate 202. In legacy implementations, other connections between the PICs 204 and the SOC 210 may include a silicon interposer (not shown), or a redistribution layer (not shown) on top of the substrate 202. An integrated heat spreader (IHS) 214 in legacy implementations may be thermally coupled with the PICs 204 and the SOC 210 for cooling. In addition, there may be one or more fiber supports 216 to provide support for the optical paths 206. In implementations, these optical paths may be waveguides. In other legacy implementations, the SOC 210 may instead be a central processing unit (CPU), graphics processing unit (GPU), field programmable gate array (FPGA), application specific integrated circuit (ASIC), accelerator, or some other processing device.

Figure 2B:
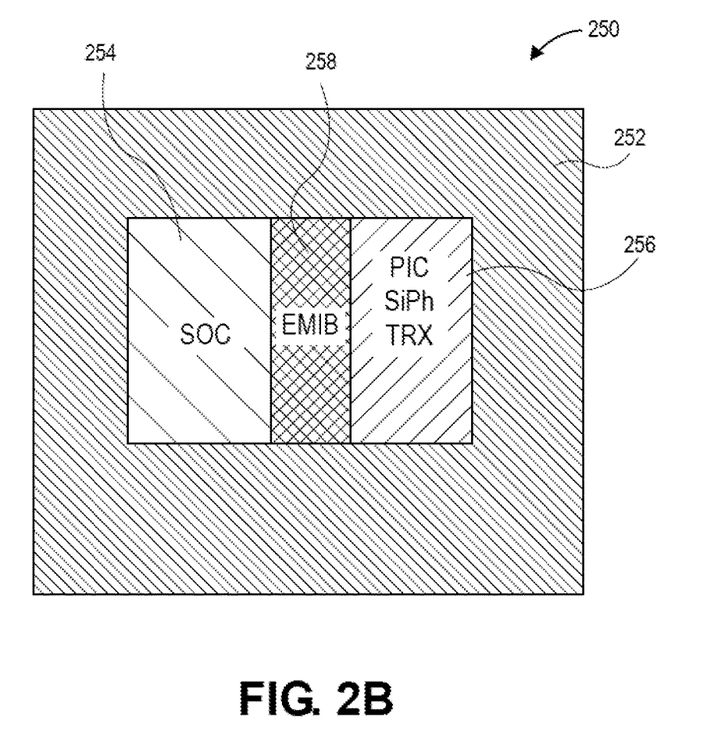

FIG. 2B shows legacy package 250 as a top-down diagram of an example legacy implementation of an optical multichip package. Legacy package 250 includes substrate 252, which may be similar to substrate 202, on to which a SOC 254, which may be similar to SOC 210, and a silicon photonics transceiver 256 or multiple PICs (not shown) are coupled. The PIC can be integrated on south/north/east/west side of the SOC. Or, it can be directly integrated on top or bottom of the SOC. The SOC 254 and the silicon photonics transceiver 256, which may be similar to PIC 204, may be electrically coupled using an EMIB 258, which may be similar to EMIB 212. In legacy implementations, a parallel advanced interface bus (MB) may be used to electrically couple the SOC 254 and the silicon photonics transceiver 256. Alternatively, electrical coupling between the SOC and the PIC can be based on serialized interfaces. Optical fibers (not shown) may be coupled with the silicon photonics transceiver 256. Note that an optical fiber (not shown) that may be coupled with the silicon photonics transceiver 256 will transmit one light signal having one polarization, either TE or TM.

Other legacy electrical implementations of silicon photonics packages may also include circuit design optimizations, complementary metal-oxide semiconductor (CMOS) process scaling, reducing channel loss characteristics through improving PCB materials, packaging technology, sockets, and connectors. Other legacy implementations may also increase package sizes and/or pin counts to increase bandwidth.

Figure 3:
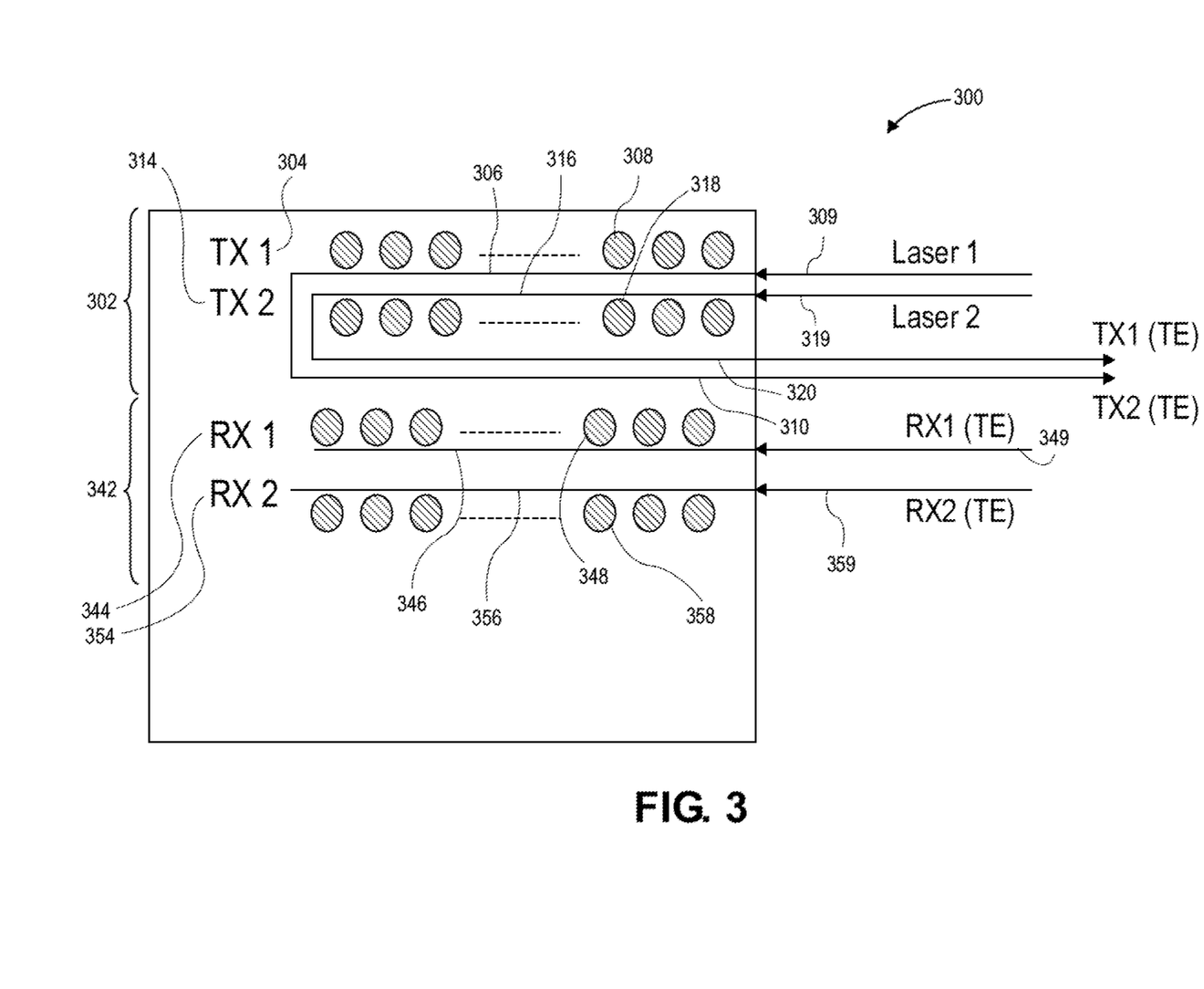
FIG. 3 is a diagram of a legacy transceiver chiplet that uses two light inputs for optical transmission and two light inputs for optical reception.

FIG. 3 is a diagram of a legacy transceiver chiplet that uses two light inputs for optical transmission and two light inputs for optical reception. In the same transceiver chiplet there may be plurality of these transceivers in the same chip. Legacy optical transceiver 300 may be similar to silicon photonics transceiver 256 of FIG. 2B. Legacy optical transceiver 300 includes an optical transmitter portion 302 and an optical receiver portion 342. The optical transmitter portion 302 may include a first optical transmitter 304 and a second optical transmitter 314. The first optical transmitter 304 includes an input waveguide 306 that is optically coupled with one or more optical rings 308 and electro-optical circuitry (not shown). The second optical transmitter 314 includes an input waveguide 316 that is optically coupled with one or more optical rings 318, and electro-optical circuitry (not shown).

For optical transmission, two light inputs 309, 319 are received by the optical transceiver 300, first light input 309 optically coupled with waveguide 306 and second light input 319 optically coupled with waveguide 316. In other implementations, laser pulse generators (not shown) may be used instead of light inputs 309, 319. The first optical transmitter 304 will transmit an optical signal on the first light output 310, and the second optical transmitter 314 will transmit an optical signal on the second light output 320. Thus, the first light input 309 directly drives the first light output 310, and the second light input 319 directly drives the second light output 320. The light output 310, 320 has the same polarization, for example a selected one of TE or TM.

Receiver portion 342 includes a first optical receiver 344 and a second optical receiver 354. The first receiver 344 includes an optical waveguide 346 coupled with one or more optical rings 348, with light input 349 coupled with the optical waveguide 346. The second receiver 354 includes an optical waveguide 356 coupled with one or more optical rings 358, with light input 359 coupled with the optical waveguide 356.

Note that these implementations work with one light polarization only. Although these legacy implementations may address some power efficiency, bandwidth density, and channel loss issues discussed with respect to FIG. 1, these legacy implementations do not utilize dual polarization to convert two light signals onto optical paths into one light signal on one optical path to increase bandwidth or to reduce fiber counts.

Figure 4:
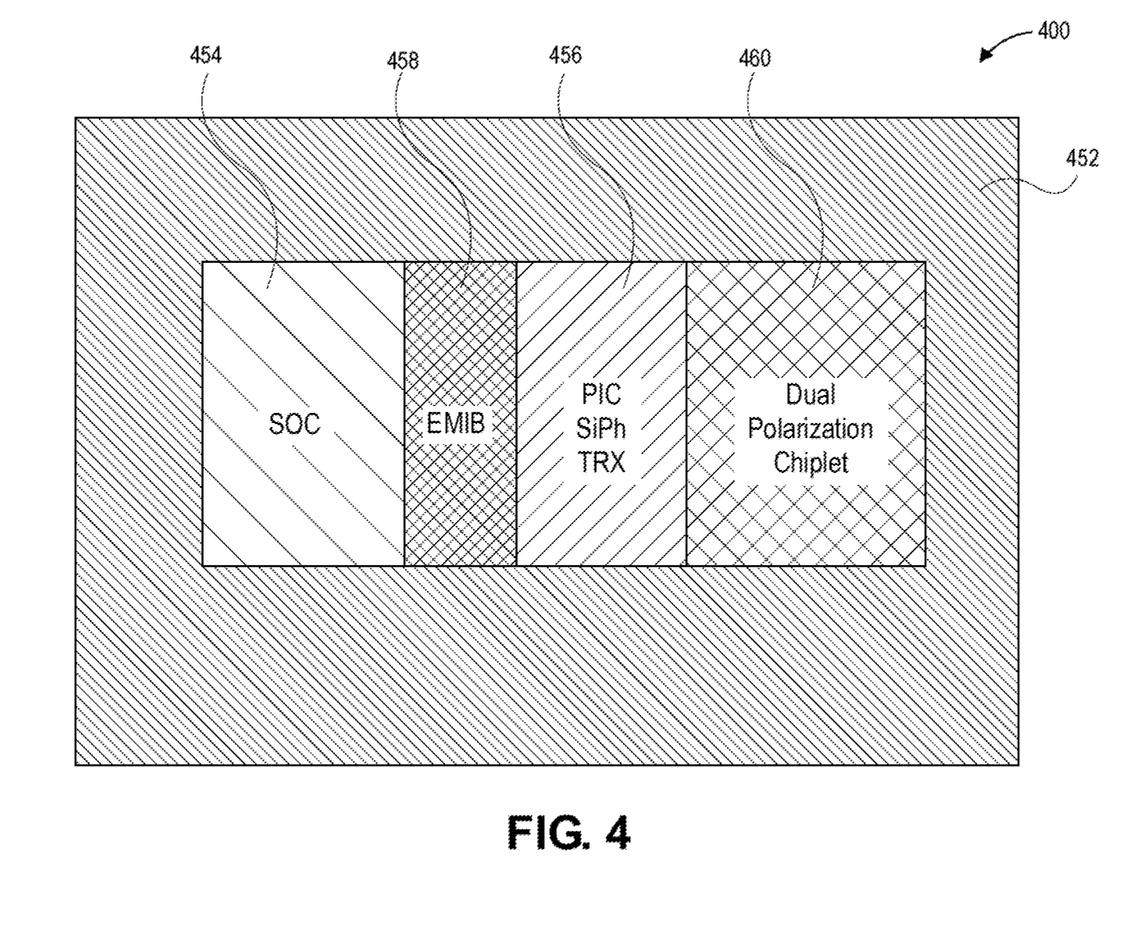
FIG. 4 is a top-down diagram of a package that includes a dual polarization chiplet, in accordance with various embodiments.

FIG. 4 is a top-down diagram of a package that includes a dual polarization chiplet, in accordance with various embodiments. Optical package 400 includes a substrate 452, an SOC 454, an EMIB 458, and a photonics transceiver chip 456, which may be similar to substrate 252, SOC 254, EMIB 258, and photonics transceiver chip 256 of FIG. 2. Note that in embodiments, the photonics transceiver chip 256 may be an optical receiver or an optical transmitter. In embodiments, SOC 454 may be any chip or processor, including CPU, GPU, ASIC, and the like. In embodiments, the EMIB 458 may be embedded into the substrate 452, and may electrically couple the SOC 454 with the silicon photonics transceiver chip 456. In embodiments, a different electrical coupling structure other than the EMIR 458 may be used, for example an AIB, a silicon interposer, organic routing, or an RDL on the substrate 452.

In embodiments, a dual polarization chiplet 460, or "dual polarization chip" 460 is optically coupled with the photonics transceiver chip 456. In embodiments, the dual polarization chip 460 may provide three optical functions when optically coupled with the photonics transceiver chip 456. The first may be to receive incoming light on a single fiber and to split that incoming light onto two fibers that are then optically coupled with the photonics transceiver chip 456 to be used for multiple optical transmitters within the photonics transceiver chip 456. The second may be to receive a plurality of light signals on different optical fibers from the multiple transmitters within the photonics transceiver chip 456, to convert the polarity on the different optical fibers so that they each have different polarities, and then combine the resulting light signals onto a single fiber to create a single light signal on a wavelength that has multiple polarities. The third is to receive incoming light on a single fiber that includes multiple optical signals with multiple polarities, then split the multiple optical signals into individual optical signals on separate waveguides and/or fibers, to be received by multiple optical receivers within the photonics transceiver chip 456. These optical functions are described in greater detail below.

Figure 5:
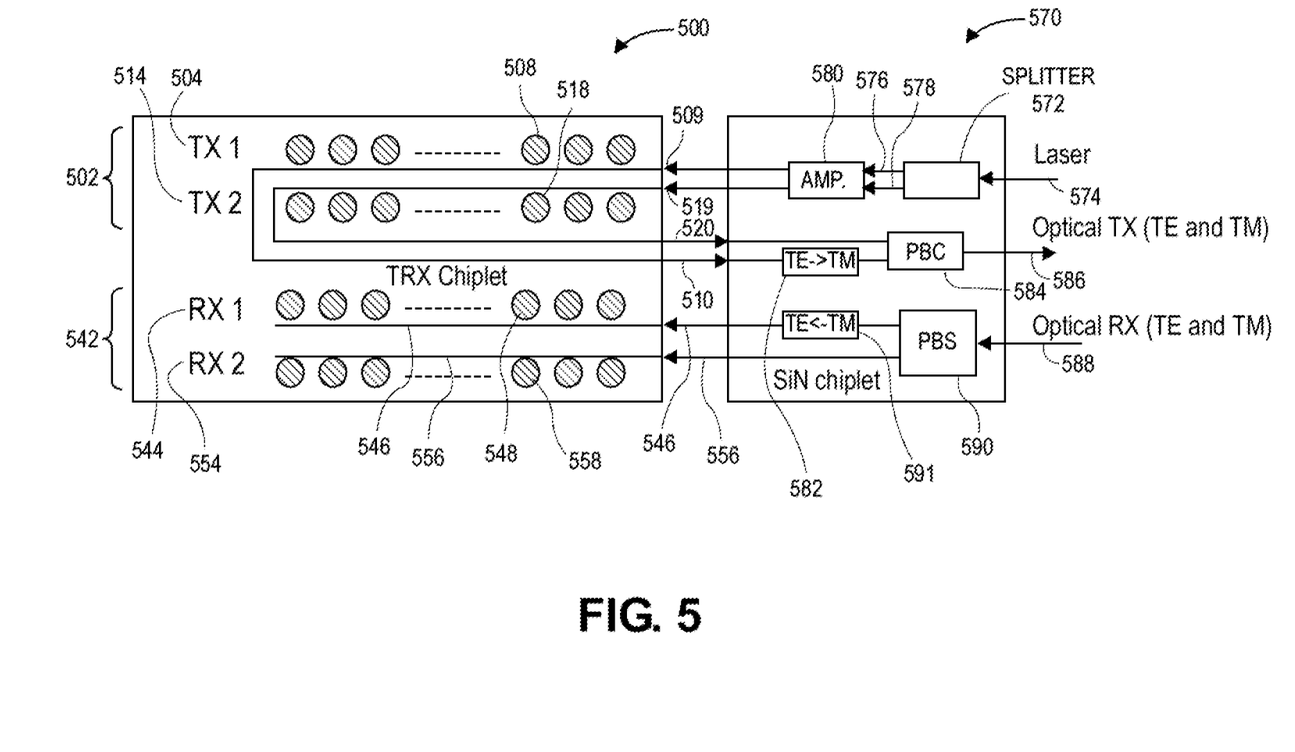
FIG. 5 is a diagram of a transceiver chiplet optically coupled with a dual polarization chiplet, in accordance with various embodiments.

FIG. 5 is a diagram of a transceiver chiplet optically coupled with a dual polarization chiplet, in accordance with various embodiments. Dual polarization chiplet 570 may be optically coupled in a number of different configurations with optical transceiver 500, which may be similar to optical transceiver 300 of FIG. 3.

Dual polarization chiplet 570 may be developed and/or implemented within a low optical loss photonics technology, for example silicon nitride (SiN), indium phosphide (InP), or silicon. Some other materials or combination of materials may be used, depending upon the particular operational requirements of the dual polarization chiplet 570 to achieve a preferred optical performance. In embodiments, the dual polarization chiplet 570 may then be heterogeneously integrated with the rest of an optical MCP as discussed further below. Heterogeneous integration may involve the use of multiple silicon chips, each having a specific purpose, such as an FPGA, a SOC, or high bandwidth memory (HBM), organized either on top of each other, referred to as 3D, using embedded bridges, referred to as 2.5D, or organized adjacent to each other on the substrate, referred to as 2D.

Optical transceiver 500 may include an optical transmitter portion 502, and an optical receiver portion 542. In other embodiments there may be multiple optical transmitter portions 502 and multiple optical receiver portions 504. The optical transmitter portion 502 may include a first optical transmitter 504 and a second optical transmitter 514. As described in further detail with respect to FIG. 3, the first optical transmitter 504 and the second optical transmitter 514 may receive a light signal, respectively, from first light input 509 and second light input 519. In embodiments, the dual polarization chiplet 570 may include a splitter 572 that may receive a light signal from a light source along the light path 574. The splitter 572 then splits the received light into multiple light signals along light paths 576, 578. In embodiments, the multiple light signals along the light paths 576, 578 will be of the same wavelength and same polarization of the light signal received from the light path 574. In embodiments, one or more of the multiple light paths 576, 578 may pass through an amplifier 580, to amplify the light signals along the one or more multiple light paths 576, 578. The output of the amplifier 582 may correspond with the light signal inputs 509, 519 of the optical transceiver 500, to provide light signals at a proper power level for the first transmitter 504 or the second transmitter 514.

The first optical transmitter 504 and the second optical transmitter 514 of optical transmission portion 502 of optical transceiver 500 may interact in other ways with the dual polarization chiplet 570. For example, the first light signal output 510 and the second light signal output 520, which may be similar to the first light signal output 310 and the second light signal output 320 of FIG. 3, may be optically coupled with the dual polarization chiplet 570. In embodiments, the first light signal output 510 may be coupled with a polarization converter 582 to change a polarization of the light signal on the first light output 510. For example, the polarization may change from TE to TM, or may change from TM to TE. From the polarization converter 582, the light signal may pass to a polarization beam combiner (PBC) 584. The second light signal output 520 may enter the dual polarization chiplet 570 and optically couple with the PBC 584. The resulting combined polarization light signal output 586 will be a light signal having a particular wavelength that carries the optical transmission from the first transmitter 504 and the optical transmission from the second transmitter 514 using different polarizations within a single light signal beam. In this way, a single optical fiber (not shown) may be coupled with the dual polarization chiplet 570 to carry two transmissions, instead of requiring two optical fibers to be coupled with the dual polarization chiplet 570.

In embodiments, the optical transceiver 500 may interact in other ways with the dual polarization chiplet 570. In embodiments, the optical receiver portion 542, that includes a first optical receiver 544 and a second optical receiver 554, may receive light signals, respectively, on a first light path 546 and a second light path 556, from the dual polarization chiplet 570. In embodiments, the dual polarization chiplet 570 may receive light from optical receiver input 588. In embodiments, the light signals on the optical receiver input 588 may be on a single wavelength, but include multiple polarizations of light. For example, one of the polarizations may be TE, and the other polarization may be TM. In this way, multiple optical signals may be carried on the optical receiver input 588. In embodiments, the optical receiver input 588 may be coupled with a polarization beam splitter (PBS) 590. The PBS 590 may have two optical outputs that optically couple, respectively, with the first light path 546 and the second light path 556. The optical signal with the first polarization may be transmitted to the first light path 546, and the optical signal with the second polarization may be transmitted to the second light path 556. In embodiments, the PBS 590 may modify the polarizations of the first optical output and/or the second optical output prior to optical transmission to the optical transceiver 500. In other embodiments, a polarization rotator 591 may be optically coupled with one of the outputs of the PBS 590 two cause a polarization change in the optical output 546.

Figure 6:
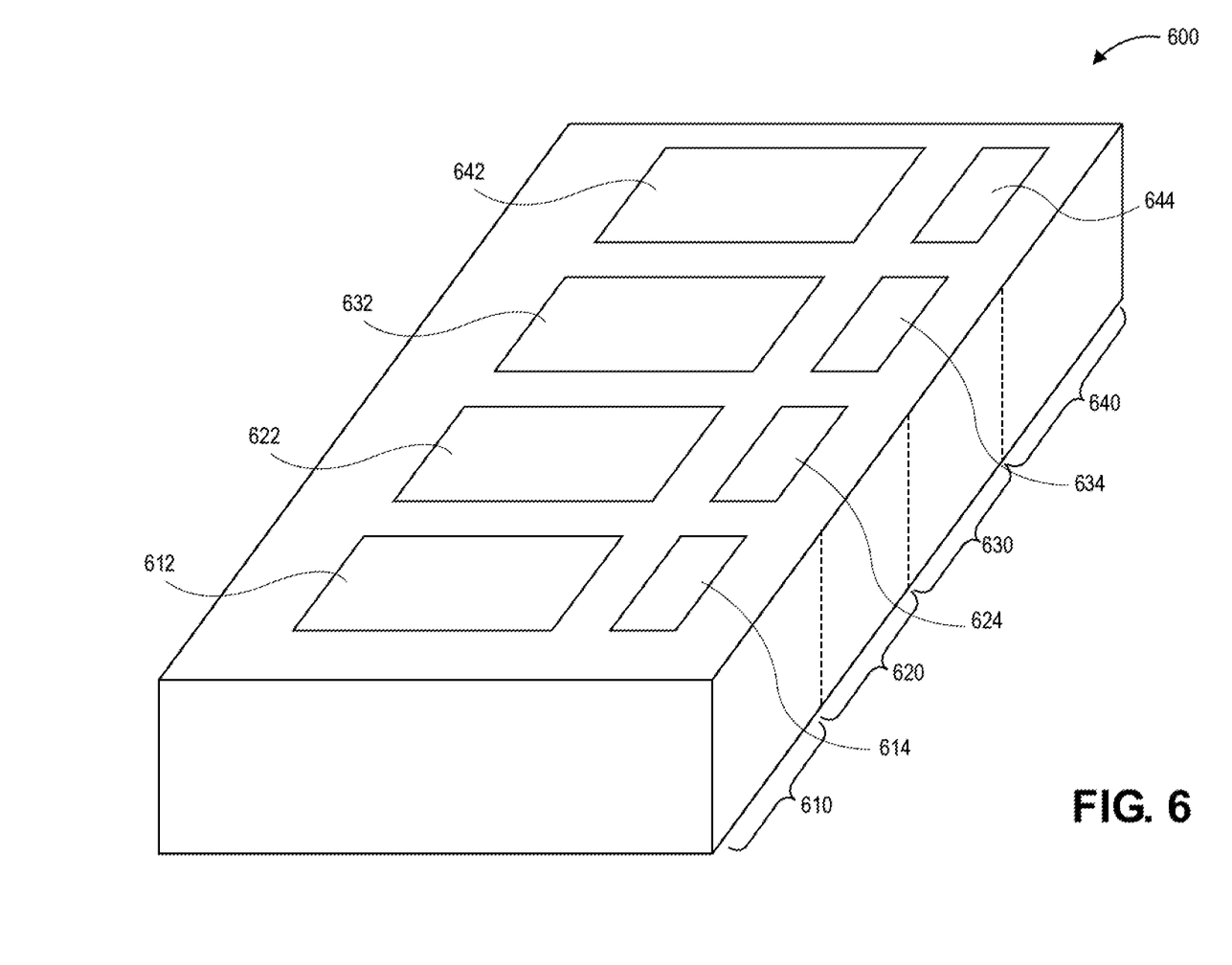
FIG. 6 is a diagram of a package that includes multiple transceiver chiplets optically coupled with multiple dual polarization chiplets, in accordance with various embodiments.

FIG. 6 is a diagram of a package that includes multiple transceiver chiplets optically coupled with multiple dual polarization chiplets, in accordance with various embodiments. Multiple optical transceiver block 600 may include multiple optical transceivers 612, 622, 632, 642, which may be similar to optical transceiver 500 of FIG. 5 or similar to PIC 456 of FIG. 4. The multiple optical transceivers 612, 622, 632, 642 are optically coupled, respectively, with multiple dual polarization chiplets 614, 624, 634, 644, which may be similar to dual polarization chiplet 570 of FIG. 5, or similar to dual polarization chiplet 460 of FIG. 4. In embodiments, the respective multiple optical transceivers 612, 622, 632, 642 may be coupled with the dual polarization chaplet 614, 624, 634, 644, to form polarization transceiver units 610, 620, 630, 640.

In embodiments, each of the multiple dual polarization chiplets 614, 624, 634, 644 may have varying numbers of optical connectors (not shown) that may be coupled with optical fibers (not shown) according to the various embodiments described above with respect to dual polarization chiplet 570 of FIG. 5. In embodiments, optical fibers (not shown) may connect with a top or a side of the dual polarization chiplets 614, 624, 634, 644.

In embodiments, the multiple optical transceiver block 600 may include any number of optical transceivers such as optical transceiver 612 optically coupled with dual polarization chiplets 614. In embodiments, the optical coupling may include waveguides, fiber-optic coupling, or open air cavities through which light may travel. In embodiments, one or more lenses (not shown) may be coupled to an optical transceiver 612 and a dual polarization chiplet 614 to facilitate light signal transmission through an open air cavity between the two components. In embodiments, there may be two or more multiple optical transceiver blocks 600 that may be physically and/or electrically coupled to a substrate, such as substrate 452 of FIG. 4, and may be electrically coupled with one or more SOC, such as SOC 454 of FIG. 4.

Figure 7:
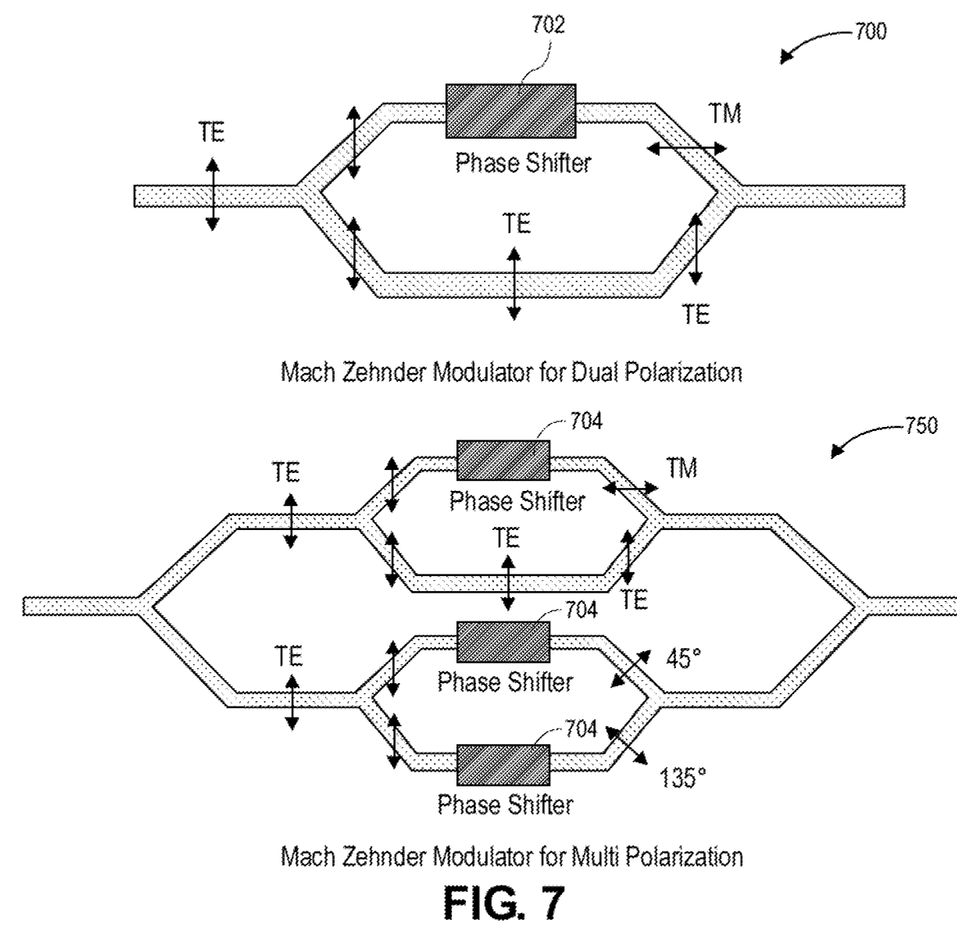
FIG. 7 shows two diagrams of a Mach Zehnder (MZ) modulator for performing polarization conversion, in accordance with various embodiments.

FIG. 7 shows two diagrams of a Mach Zehnder (MZ) modulator for performing polarization conversion, in accordance with various embodiments. MZ modulator for dual polarization 700 and MZ modulator for multi-polarization 750 are shown as examples of technology that may be used to support dual polarization chiplet design, for example for dual polarization chiplet 460 of FIG. 4, 570 of FIG. 5, and 614, 624, 634, 644 of FIG. 6. In embodiments, these examples may be used to implement, or support the implementation of the polarization converter 582 of FIG. 5.

MZ modulator for dual polarization 700 illustrates dual polarization of optical signals, including TE, for vertically polarized light, and TM, for horizontally polarized light. The TM polarization may created by applying a direct current (DC) voltage via the phase shifter 702.

MZ modulator for multi-polarization 750 may be used to make multi-polarization states. By tuning DC voltage with respect to one or more phase shifter 704, 45 degree)(45° and 135° linearly polarized light can be achieved in addition to 0° (TE) and 180° (TM) linearly polarized light.

FIGS. 8A-8F illustrate various examples of PIC chips coupled with dual polarization chiplets and with SOC dies, in accordance with various embodiments. Various components as described herein are shown in different configurations to make up various embodiments of MCPs incorporating dual polarization chiplet design. For example, substrate 802 may be similar to substrate 452 of FIG. 4. EMIR 858 may be similar to EMIR 458 of FIG. 4. SOC 854 may be similar to SOC 210 of FIG. 2A, SOC 254 of FIG. 2B, or SOC 454 of FIG. 4. PIC 856 may be similar to PIC 204 of FIG. 2A, 256 of FIG. 2B, 456 of FIG. 4, or 612, 622, 632, 642 of FIG. 6. Dual polarization chiplet 860 may be similar to dual polarization chiplet 460 of FIG. 4, 570 of FIG. 5, or 614, 624, 634, 644 of FIG. 6.

Figure 8A:
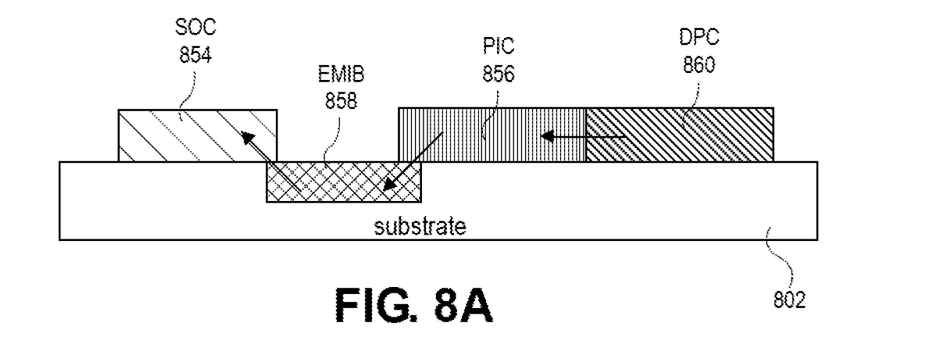
FIGS. 8A-8F illustrate various examples of silicon photonics (PIC) chips coupled with dual polarization chiplets and with system-on-a-chip (SOC) dies, in accordance with various embodiments.

FIG. 8A shows a substrate 802 with an embedded EMIB 858. The EMIB 858 electrically couples the SOC 854 and the PIC 856, which themselves are physically coupled to one side of the substrate 802. The dual polarization chiplet 860 is physically and optically coupled with the PIC 856 on the same side of the substrate 802. This embodiment allows side coupling of optical fibers (not shown) to a right side of the dual polarization chiplet 860 above the substrate 802.

In embodiments, the EMIB 858 may be another type of electrical coupling, for example an interconnect bridge, or a silicon interposer, organic routing on substrate 802 or a redistribution layer (RDL) on substrate 802. In embodiments, an integrated heat spreader (not shown) may be thermally coupled with the SOC 854, the PIC 856, and the dual polarization chip 860.

Figure 8B:
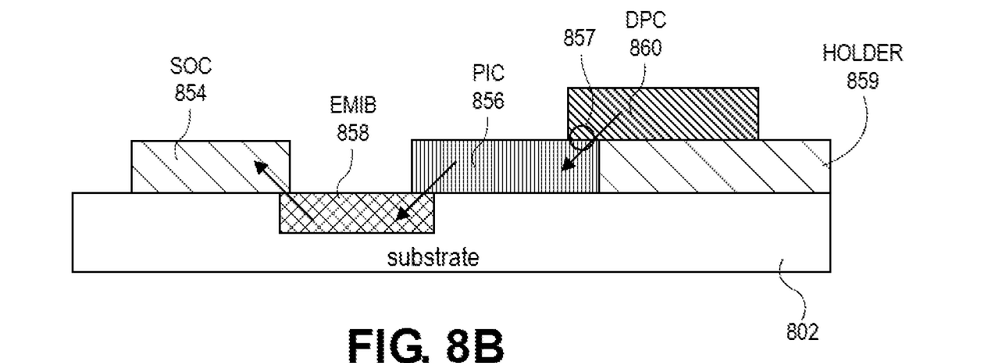

FIG. 8B shows a substrate 802 with an embedded EMIR 858. The EMIB 858 electrically couples the SOC 854 and the PIC 856, which themselves are physically coupled to one side of the substrate 802. The dual polarization chiplet 860 is physically and optically coupled with the PIC 856 at a region 857 of the PIC 856. In embodiments, the dual polarization chiplet 860 and/or the PIC 856 may include lenses, reflectors, grating couplers, filters, or other optics (not shown) to angle light into the PIC 856 within region 857.

In embodiments, a holder die 859 may be placed underneath the dual polarization chiplet 860 and next to the PIC 856 to provide physical support for the dual polarization chiplet 860. In other embodiments, the holder die 859 may include active or passive components to provide additional functions for the MCP, such as package 400 of FIG. 4.

Figure 8C:
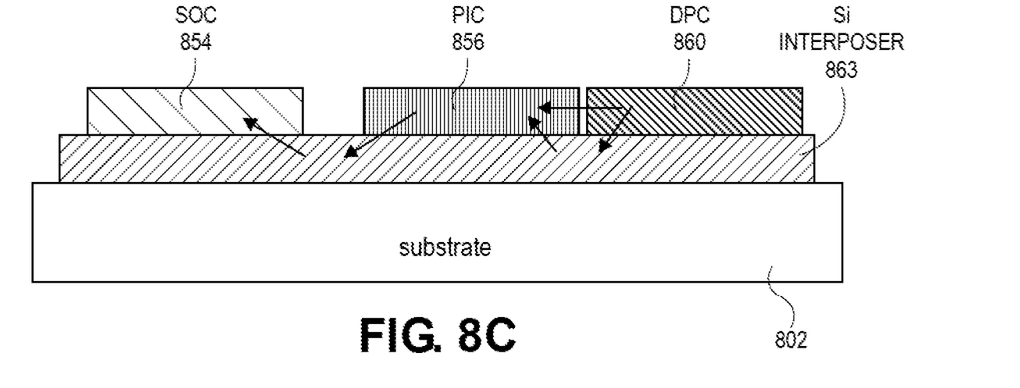

FIG. 8C includes a interposer 863, which may be a silicon interposer, on top of the substrate 802. The SOC 854, PIC 856, and dual polarization chiplet 860 are coupled to a side of the interposer 863. The interposer 863 electrically couples the SOC 854 and the PIC 856. The PIC 856 and the dual polarization chiplet 860 are optically coupled either directly or through the interposer 863.

Figure 8D:
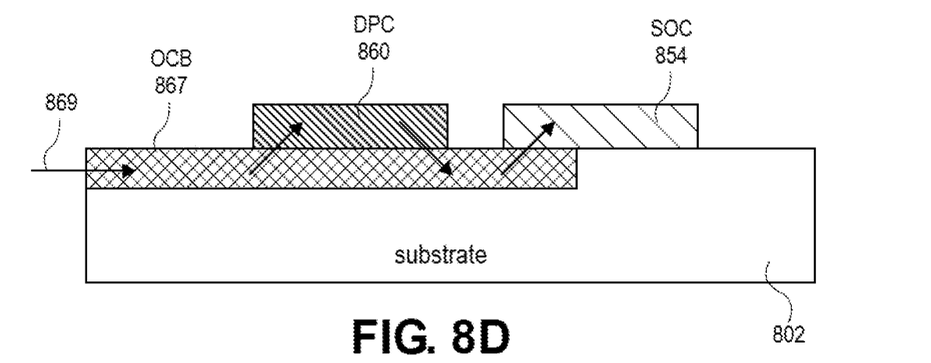

FIG. 8D includes an open cavity bridge (OCB) 867, that is coupled with the substrate 802. The dual polarization chiplet 860 is physically, optically, and electrically coupled to the OCB 867. During operation, light 869 enters the OCB 867, travels into the dual polarization chiplet 860, and back into the OCB 867. The OCB 867 is electrically coupled with the SOC 854.

Figure 8E:
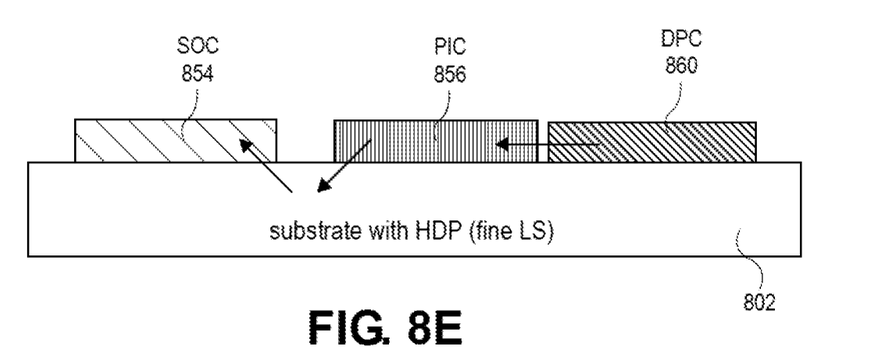

FIG. 8E includes a substrate 802 onto which an SOC 854, a PIC 856, and a dual polarization chiplet 860 are coupled. The PIC 856 and the SOC 854 are electrically coupled via a high-density packaging (HDP) layer (not shown) on the substrate 802. HDP provides fine spacing that is needed to allow for higher bandwidths. In embodiments, a redistribution layer (RDL) (not shown) may be used to electrically couple the PIC 856 and the SOC 854.

Figure 8F:
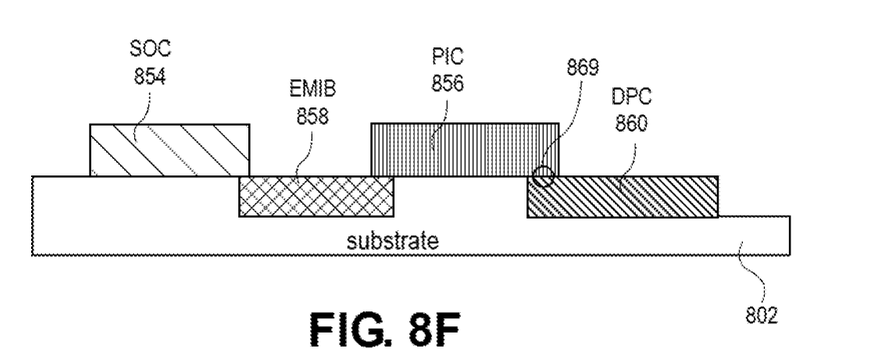

FIG. 8F includes a substrate 802 that includes an embedded EMIB 858 to electrically couple and SOC 854 and a PIC 856 that are coupled to the substrate 802. A dual polarization chiplet 860 is embedded into the substrate 802, and is optically coupled with the PIC 856. In embodiments, in the region 869. In embodiments, the dual polarization chiplet 860 and/or the PIC 856 may include lenses, reflectors, grating couplers, filters, or other optics (not shown) to angle light into the PIC 856 within region 869. Note that there is no substrate 802 material immediately to the right of the dual polarization chiplet 860, to allow optical fiber (not shown) connections to be made to the dual polarization chiplet 860.

Figure 9:
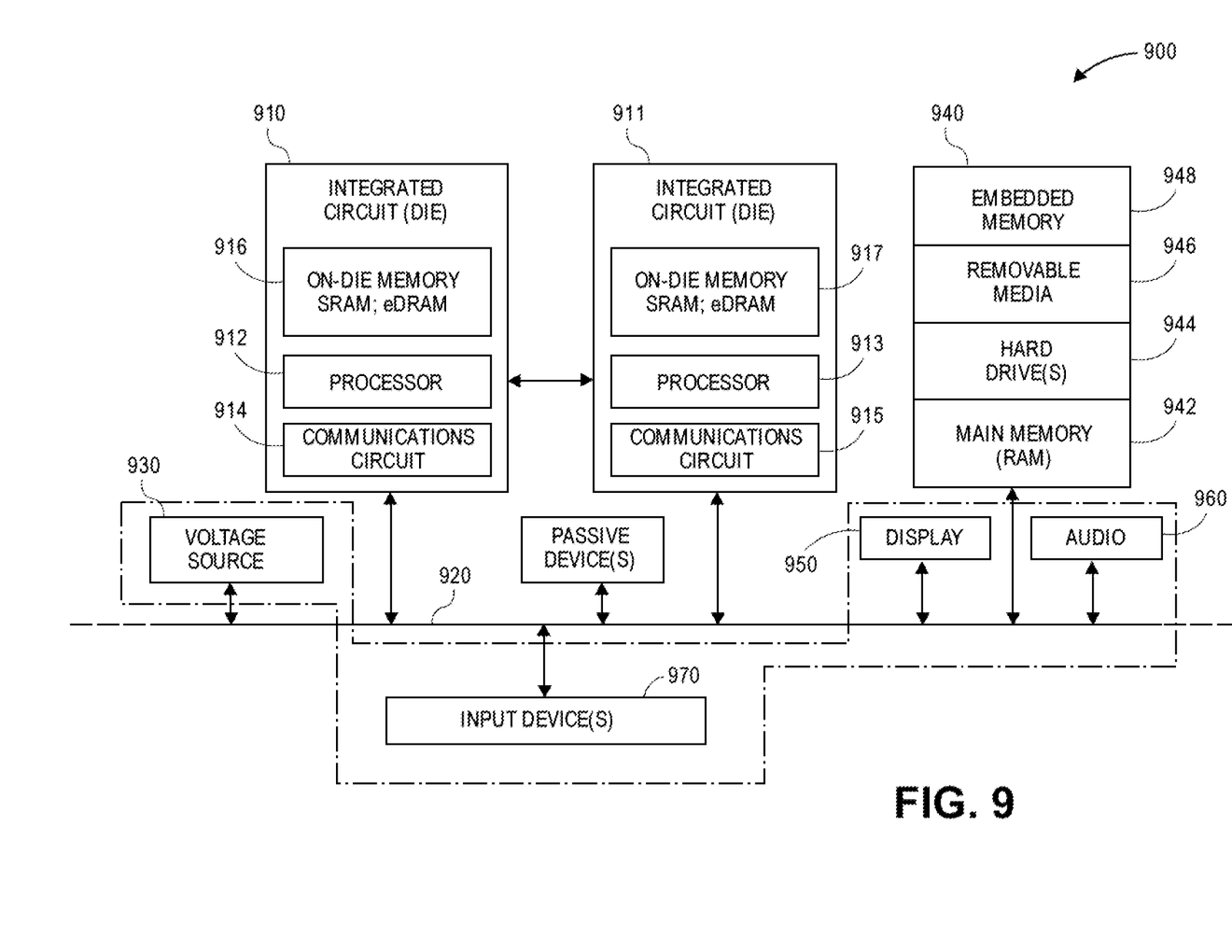
FIG. 9 schematically illustrates a computing device, in accordance with various embodiments.

FIG. 9 schematically illustrates a computing device, in accordance with various embodiments. The computer system 900 (also referred to as the electronic system 900) as depicted can embody all or part of converting multiple light signals into and out of a single wavelength with multiple polarizations to increase optical bandwidth, according to any of the several disclosed embodiments and their equivalents as set forth in this disclosure. The computer system 900 may be a mobile device such as a netbook computer. The computer system 900 may be a mobile device such as a wireless smart phone. The computer system 900 may be a desktop computer. The computer system 900 may be a hand-held reader. The computer system 900 may be a server system. The computer system 900 may be a supercomputer or high-performance computing system.

In an embodiment, the electronic system 900 is a computer system that includes a system bus 920 to electrically couple the various components of the electronic system 900. The system bus 920 is a single bus or any combination of busses according to various embodiments. The electronic system 900 includes a voltage source 930 that provides power to the integrated circuit 910. In some embodiments, the voltage source 930 supplies current to the integrated circuit 910 through the system bus 920.

The integrated circuit 910 is electrically coupled to the system bus 920 and includes any circuit, or combination of circuits according to an embodiment. In an embodiment, the integrated circuit 910 includes a processor 912 that can be of any type. As used herein, the processor 912 may mean any type of circuit such as, but not limited to, a microprocessor, a microcontroller, a graphics processor, a digital signal processor, or another processor. In an embodiment, the processor 912 includes, or is coupled with, all or part of converting multiple light signals into and out of a single wavelength with multiple polarizations to increase optical bandwidth, as disclosed herein. In an embodiment, SRAM embodiments are found in memory caches of the processor. Other types of circuits that can be included in the integrated circuit 910 are a custom circuit or an application-specific integrated circuit (ASIC), such as a communications circuit 914 for use in wireless devices such as cellular telephones, smart phones, pagers, portable computers, two-way radios, and similar electronic systems, or a communications circuit for servers. In an embodiment, the integrated circuit 910 includes on-die memory 916 such as static random-access memory (SRAM). In an embodiment, the integrated circuit 910 includes embedded on-die memory 916 such as embedded dynamic random-access memory (eDRAM).

In an embodiment, the integrated circuit 910 is complemented with a subsequent integrated circuit 911. Useful embodiments include a dual processor 913 and a dual communications circuit 915 and dual on-die memory 917 such as SRAM. In an embodiment, the dual integrated circuit 910 includes embedded on-die memory 917 such as eDRAM.

In an embodiment, the electronic system 900 also includes an external memory 940 that in turn may include one or more memory elements suitable to the particular application, such as a main memory 942 in the form of RAM, one or more hard drives 944, and/or one or more drives that handle removable media 946, such as diskettes, compact disks (CDs), digital variable disks (DVDs), flash memory drives, and other removable media known in the art. The external memory 940 may also be embedded memory 948 such as the first die in a die stack, according to an embodiment.

In an embodiment, the electronic system 900 also includes a display device 950, an audio output 960. In an embodiment, the electronic system 900 includes an input device such as a controller 970 that may be a keyboard, mouse, trackball, game controller, microphone, voice-recognition device, or any other input device that inputs information into the electronic system 900. In an embodiment, an input device 970 is a camera. In an embodiment, an input device 970 is a digital sound recorder. In an embodiment, an input device 970 is a camera and a digital sound recorder.

As shown herein, the integrated circuit 910 can be implemented in a number of different embodiments, including all or part of increasing optical bandwidth with light having multiple polarizations, according to any of the several disclosed embodiments and their equivalents, an electronic system, a computer system, one or more methods of fabricating an integrated circuit, and one or more methods of fabricating an electronic assembly that includes a package substrate implementing all or part of converting multiple light signals into and out of a single wavelength with multiple polarizations to increase optical bandwidth, according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed processes used for increasing optical bandwidth with light having multiple polarizations embodiments and their equivalents. A foundation substrate may be included, as represented by the dashed line of FIG. 9. Passive devices may also be included, as is also depicted in FIG. 9.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

The following paragraphs describe examples of various embodiments.

EXAMPLES

Example 1 is an apparatus to facilitate optical signal transmission, the apparatus comprising: a polarization beam converter (PBC); a first optical input to receive a first light signal from a first optical transmitter, the first optical input optically coupled with the PBC; a second optical input to receive a second light signal from a second optical transmitter, the second optical input optically coupled with the PBC, wherein a polarization converter is disposed between the second optical input and the PBC to convert the second light signal into a second light signal with altered polarization; and wherein the PBC is to combine the first light signal and the second light signal with altered polarization to transmit information carried on first signal and on the second signal on a same wavelength.

Example 2 may include the apparatus of example 1, wherein the PCB is to output the combined light signal on an optical fiber.

Example 3 may include the apparatus of example 1, wherein a wavelength of the first light signal and a wavelength of the second light signal with altered polarization is a same wavelength.

Example 4 may include the apparatus of example 1, wherein the first light signal and the second light signal have a TE polarization, and the second light signal with altered polarization has a TM polarization.

Example 5 may include the apparatus of example 1, further comprising: a third optical input to receive a third light signal; a splitter coupled with the third optical input, to split the third light signal into a fourth light signal and a fifth light signal, the fourth light signal coupled with a first optical output and the fifth light signal coupled with a second optical output; and wherein the first optical output to optically couple with the first optical transmitter, and the second optical output to optically couple with the second optical transmitter.

Example 6 may include the apparatus of example 5, further comprising an optical amplifier optically disposed between the splitter and the first optical output and/or the second optical output.

Example 7 may include the apparatus of example 6, wherein the optical amplifier amplifies the first optical signal and the second optical signal.

Example 8 may include the apparatus of any one of examples 1-7, wherein the apparatus is included in a silicon nitride (SiN) chiplet or an InP chiplet.

Example 9 is an apparatus to facilitate optical signal reception, the apparatus comprising: an optical input to receive a light signal, the light signal including multiple polarizations; a polarization beam splitter (PBS) coupled with the first optical input, the PBS to split the received light signal into a first light signal with a first polarization and into a second light signal with a second polarization; and a first optical output and a second optical output, wherein the first light signal with the first polarization is coupled with the first optical output and the second light signal with the second polarization is coupled with the second optical output.

Example 10 may include the apparatus of example 9, wherein the first polarization is a TE polarization and the second polarization is a TM polarization.

Example 11 may include the apparatus of example 9, wherein the first optical output is optically coupled with a first optical receiver, and/or the second optical output is optically coupled with a second optical receiver.

Example 12 may include the apparatus of example 9, further comprising an optical fiber coupled with the optical input.

Example 13 may include the apparatus of any one of examples 9-12, wherein the apparatus is included in a chiplet.

Example 14 is a transceiver system, comprising: an optical chiplet including: a polarization beam combiner (PBC); a first optical input to receive a first light signal with a first polarization from a first optical transmitter, the first optical input optically coupled with the PBC; a second optical input to receive a second light signal with the first polarization from a second optical transmitter, the second optical input optically coupled with the PBC, wherein a polarization converter is disposed between the second optical input and the PBC to convert the second light signal into a second light signal with a second polarization; and wherein the PBC is to combine the first light signal with the first polarization and the second light signal with the second polarization to transmit information carried on the first light signal and on the second light signal on a same wavelength; and an optical transceiver chiplet optically coupled with the optical chiplet, the optical transceiver including: a first optical output to couple with the first optical input of the optical chiplet; and a second optical output to couple with the second optical input of the optical chiplet.

Example 15 may include the transceiver system of example 14, wherein the optical chip further includes a first optical output coupled with an output of the PBC to transmit the combined the first light signal with the first polarization and the second light signal with the second polarization.

Example 16 may include the transceiver system of example 15, wherein the optical chip further includes an optical fiber coupled with the first optical output.

Example 17 may include the transceiver system of example 14, wherein the optical chip further includes: a third optical input to receive a light signal, the light signal including multiple polarizations; a polarization beam splitter (PBS) coupled with the third optical input, the PBS to split the light signal into a third light signal with a third polarization and into a fourth light signal with a fourth polarization; and a second optical output and a third optical output, wherein the third light signal with the third polarization is coupled with the second optical output and the second light signal with the fourth polarization is coupled with the third optical output; and wherein the optical transceiver chiplet further includes: a first optical input optically coupled with the second optical output of the optical chip; and a second optical input optically coupled with the third optical output of the optical chip.

Example 18 may include the transceiver system of example 14, further comprising a substrate; and wherein the transceiver chiplet and the optical chiplet are physically and/or electrically coupled with the substrate.

Example 19 may include the transceiver system of example 14, wherein the first polarization is a TE polarization and the second polarization is a TM polarization.

Example 20 may include the transceiver system of example 14, wherein the optical chiplet is multiple optical chiplets and wherein the optical transceiver is multiple optical transceivers optically coupled, respectively, with the multiple optical chiplets.

What is claimed is:

1. An apparatus to facilitate optical signal transmission, the apparatus comprising:
   a polarization beam converter (PBC), the PBC on a first chiplet;
   a first optical input to receive a first light signal from a first optical transmitter, the first optical input optically coupled with the PBC;
   a second optical input to receive a second light signal from a second optical transmitter, the second optical input optically coupled with the PBC, wherein a polarization converter is disposed between the second optical input and the PBC to convert the second light signal into a second light signal with altered polarization, wherein the first optical transmitter and the second optical transmitter are on a second chiplet, the second chiplet separate and distinct from the first chiplet; and
   wherein the PBC is to combine the first light signal and the second light signal with altered polarization to transmit information carried on first signal and on the second signal on a same wavelength.

2. The apparatus of claim 1, wherein the PCB is to output the combined light signal on an optical fiber.

3. The apparatus of claim 1, wherein a wavelength of the first light signal and a wavelength of the second light signal with altered polarization is a same wavelength.

4. The apparatus of claim 1, wherein the first light signal and the second light signal have a TE polarization, and the second light signal with altered polarization has a TM polarization.

5. The apparatus of claim 1, further comprising:
   a third optical input to receive a third light signal;
   a splitter coupled with the third optical input, to split the third light signal into a fourth light signal and a fifth light signal, the fourth light signal coupled with a first optical output and the fifth light signal coupled with a second optical output; and
   wherein the first optical output to optically couple with the first optical transmitter, and the second optical output to optically couple with the second optical transmitter.

6. The apparatus of claim 5, further comprising an optical amplifier optically disposed between the splitter and the first optical output and/or the second optical output.

7. The apparatus of claim 6, wherein the optical amplifier amplifies the first optical signal and the second optical signal.

8. The apparatus of claim 1, wherein the apparatus is included in a silicon nitride (SiN) chiplet or an InP chiplet.

9. An apparatus to facilitate optical signal reception, the apparatus comprising:
   an optical input to receive a light signal, the light signal including multiple polarizations;
   a polarization beam splitter (PBS) coupled with the first optical input, the PBS to split the received light signal into a first light signal with a first polarization and into a second light signal with a second polarization, the PBS on a first chiplet; and
   a first optical output and a second optical output, wherein the first light signal with the first polarization is coupled with the first optical output and the second light signal with the second polarization is coupled with the second optical output, wherein the first optical input is coupled to a first optical transceiver and the second optical input is coupled to a second optical transceiver, and wherein the first optical transceiver and the second optical transceiver are on a second chiplet, the second chiplet separate and distinct from the first chiplet.

10. The apparatus of claim 9, wherein the first polarization is a TE polarization and the second polarization is a TM polarization.

11. The apparatus of claim 9, further comprising an optical fiber coupled with the optical input.

12. The apparatus of claim 9, wherein the apparatus is included in a chiplet.

13. A transceiver system, comprising:
   an optical chiplet including:
      a polarization beam combiner (PBC);
      a first optical input to receive a first light signal with a first polarization from a first optical transmitter, the first optical input optically coupled with the PBC;
      a second optical input to receive a second light signal with the first polarization from a second optical transmitter, the second optical input optically coupled with the PBC, wherein a polarization converter is disposed between the second optical input and the PBC to convert the second light signal into a second light signal with a second polarization; and
      wherein the PBC is to combine the first light signal with the first polarization and the second light signal with the second polarization to transmit information carried on the first light signal and on the second light signal on a same wavelength; and
   an optical transceiver chiplet optically coupled with the optical chiplet, the optical transceiver including:
      a first optical output to couple with the first optical input of the optical chiplet; and
      a second optical output to couple with the second optical input of the optical chiplet.

14. The transceiver system of claim 13, wherein the optical chip further includes a first optical output coupled with an output of the PBC to transmit the combined the first light signal with the first polarization and the second light signal with the second polarization.

15. The transceiver system of claim 14, wherein the optical chip further includes an optical fiber coupled with the first optical output.

16. The transceiver system of claim 13, wherein the optical chip further includes:
   a third optical input to receive a light signal, the light signal including multiple polarizations;
   a polarization beam splitter (PBS) coupled with the third optical input, the PBS to split the light signal into a third light signal with a third polarization and into a fourth light signal with a fourth polarization; and
   a second optical output and a third optical output, wherein the third light signal with the third polarization is coupled with the second optical output and the second light signal with the fourth polarization is coupled with the third optical output; and
   wherein the optical transceiver chiplet further includes:

a first optical input optically coupled with the second optical output of the optical chip; and a second optical input optically coupled with the third optical output of the optical chip.

17. The transceiver system of claim 13, further comprising a substrate; and wherein the transceiver chiplet and the optical chiplet are physically and/or electrically coupled with the substrate.

18. The transceiver system of claim 13, wherein the first polarization is a TE polarization and the second polarization is a TM polarization.

19. The transceiver system of claim 13, wherein the optical chiplet is multiple optical chiplets and wherein the optical transceiver is multiple optical transceivers optically coupled, respectively, with the multiple optical chiplets.

* * * * *